United States Patent
Hu

[11] 3,836,196
[45] Sept. 17, 1974

[54] SELF PROTECTIVE SADDLE COVER FOR CYCLE

[76] Inventor: Chin-I Hu, 56, Ln. 54, Chin Hsi St., Taipei, Taiwan, China

[22] Filed: July 31, 1972

[21] Appl. No.: 276,422

[52] U.S. Cl. .............................. 297/219, 297/195
[51] Int. Cl. ............................................ A47c 31/02
[58] Field of Search .......... 297/184, 218, 219, 221, 297/226, 243, 223

[56] References Cited
UNITED STATES PATENTS

| 807,279 | 12/1905 | Kandle | 292/222 |
|---|---|---|---|
| 1,807,478 | 5/1931 | Isaacson | 297/441 X |
| 2,937,695 | 5/1960 | Coggin | 297/227 |
| 3,278,226 | 10/1966 | Magnusson | 297/219 |
| 3,537,746 | 11/1970 | Peters | 297/184 |
| 3,603,639 | 9/1971 | Wilson | 297/219 |

FOREIGN PATENTS OR APPLICATIONS

| 10,754 | 3/1911 | Great Britain | 297/219 |
|---|---|---|---|
| 389,958 | 3/1933 | Great Britain | 297/184 |
| 630,349 | 11/1961 | Canada | 297/219 |

Primary Examiner—Paul R. Gilliam
Attorney, Agent, or Firm—Moonray Kojima

[57] ABSTRACT

A saddle cover for cycles comprising a layer normally covering a saddle body, and a protective cover forming an extension of the layer, which normally is folded under the layer and affixed to the body and which is used to cover the layer and fastened together with fasteners thereby to protect the layer from the elements.

1 Claim, 3 Drawing Figures

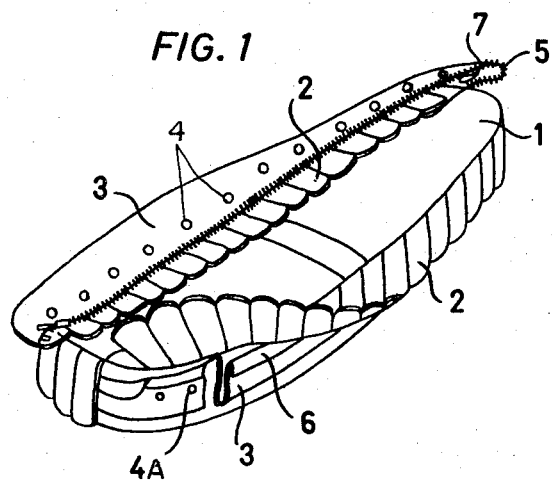
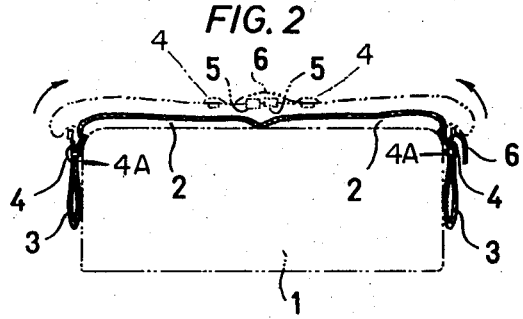
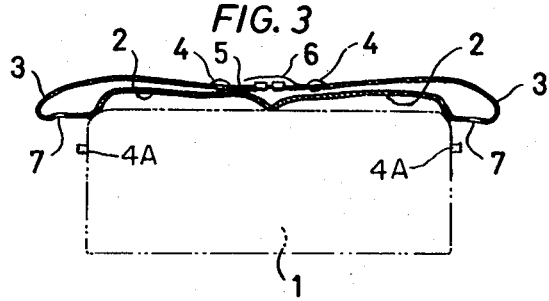

SELF PROTECTIVE SADDLE COVER FOR CYCLE

BACKGROUND OF INVENTION

This invention relates to a novel saddle cover for motorized and unmotorized cycles.

When a cycle is left outside and exposed to the elements, the conventional saddle may become overheated by the sun's rays, or it may become soaked through by rain or dew. In either case, the saddle is not desirable for riding thereafter.

SUMMARY OF INVENTION

Accordingly an object of this invention is to overcome the aforementioned disadvantages of prior saddles.

This invention encompasses a novel saddle cover which in one position acts as a normal saddle cover, and in another position is used to protect the saddle cover by folding an underlayer over the saddle cover. A heat insulating layer having a body portion and a flap portion is fit over the saddle body. An inner layer which forms the protective cover is folded beneath the layer in the normal unprotected condition. Means are provided for affixing the cover to the body. When not in use, the flaps of the layer are first folded on top of the body, then the cover is folded and brought over and covers the layer. Fastener means, such as a zipper, is provided on the cover so that a tight seal is provided. An air hole may be provided in the cover so as to permit stale air to escape.

BRIEF DESCRIPTION OF DRAWING

FIG. 1 is a perspective view of an illustrative embodiment of the invention;

FIG. 2 is a cross sectional view of FIG. 1 showing a covered or unprotective condition; and FIG. 3 is a cross sectional view of FIG. 1 showing an uncovered or protected position.

DETAILED DESCRIPTION OF PREFERRED EMBODIMENT

In FIGS. 1, 2 and 3, there are shown a heat insulating layer 2 having a body portion and flaps or fring edges which may extend downwardly and over the edges of body 1. In the unprotected or covered position or condition (i.e., when the saddle is ready for use), the layer 2 provides the saddle covering. The layer 2 is held in place by cover 3 which is connected thereto and has affixing means 4, such as holes or other female attaching means, thereon. The holes may fit over buttons or extensions or male attaching means, 4A appropriately placed on body 1.

Thus, in the unprotected or covered position, (see FIGS. 1 and 2), layer 2 rests on the top of body 1, with cover 3 which extends or is the same as layer 2, holding layer 2 in place by engaging holes 4 with extensions or buttons in the body 1. The ends of layer 2 extend over the body edge (as shown in FIG. 1) and covers folded cover 3, and thus provides good appearance.

To protect the saddle from the elements when not in use, the flap portions of layer 2 are first folded over the body portion thereof; then cover 3 is unfolded from underneath layer 2 and folded over and above layer 2 as shown in FIG. 3. Thereafter, the fasteners 5 are fastened together, thereby sealing the layer 2 from the elements. Cover 3, which is preferably of a water proof material such as plastic or similar material, has fastened thereon at the ends thereof, a fastening means, such as a zipper, or the like. At one end of cover 3 is an extension flap 6 which acts to cover the fasteners 5 when same are fastened together.

Ventilating holes 7 (see FIG. 3) are provided in cover 3 to enable escape of stale or trapped air from the fastened covered position.

The attaching means 4, which may be holes, as described above; may also be buttons which are snapped into appropriate holes in the body 1; or may also be elastic means which enable the cover to tightly fit body 1.

When the rider is again ready to use the saddle, all he needs to do is unzip zipper 5, and pull cover 3 about the edges of body 1, and then turn flaps of layer 2 over the edges of body 1 to cover the folded cover 3.

The foregoing description is intended to be only illustrative of the principles of the invention. Numerous other variations and modifications thereof would be apparent to the worker skilled in the art. All such modifications and variations are to be considered to be within the spirit and scope of the invention.

What is claimed is:

1. A saddle for a motocycle comprising
a saddle body having a plurality of female fixing means around the upper portion of side wall thereof;
heat insulating layer having a body portion and a plurality of flap portions formed integrally with said body portion, said body portion normally disposed on top of sadi saddle body and also providing cusion means, with said flap portions extending downward and over the edges thereof;
waterproof cover having two similar portions each comprising a fixed end and free end with an additional cushion means, said fixed end attached to the periphery of the upper edge of said body portion, a plurality of ventilating holes provided near each said fixed end, while a plurality of male fixing means provided near each said free end with respect to said ventilating holes, through said ventilating holes each said male and female fixing means on fixed end and free end, respectively, being such engaged together that said waterproof cover is normally disposed underneath said flap portion of said heat insulating layer in a folded condition when said heat insulating layer normally covers said saddle body, a zipper further provided at both free ends of said cover and one end thereof having an extension flap whereby in a protective position said flap portions are folded over said body portion, and then said cover is released from said fixing means and is extended over said folded flap portions and fastened together by said zipper and said extension flap covering said zipper to thereby form a ventilation compartment between said cover and said heat insulating layer when it is in a protective position.

* * * * *